Sept. 6, 1927.  
C. O. CARLSON  
1,641,371  
LOADING APPARATUS FOR SHOVEL NOSE HAND TRUCKS  
Filed Feb. 20, 1926  
2 Sheets-Sheet 1
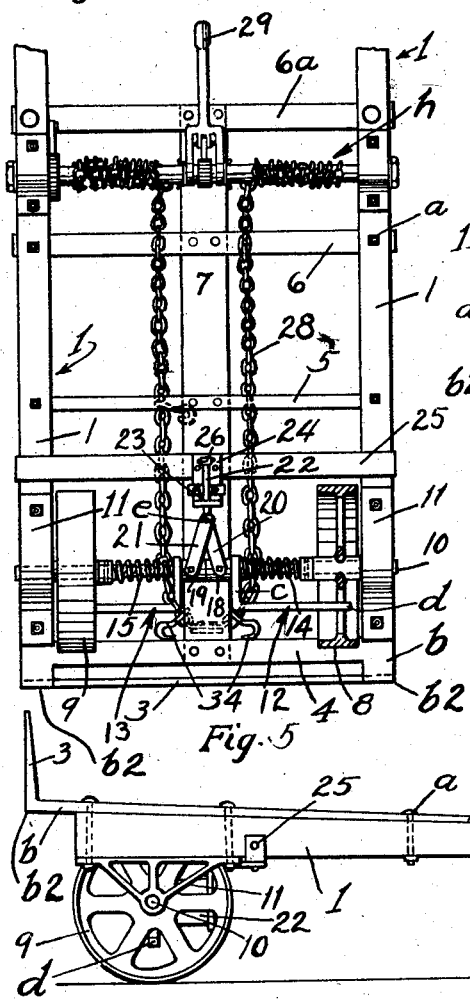
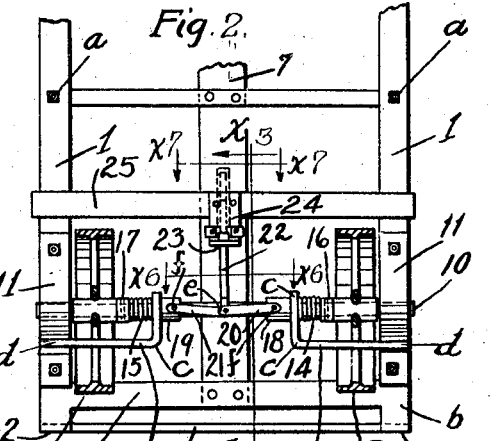
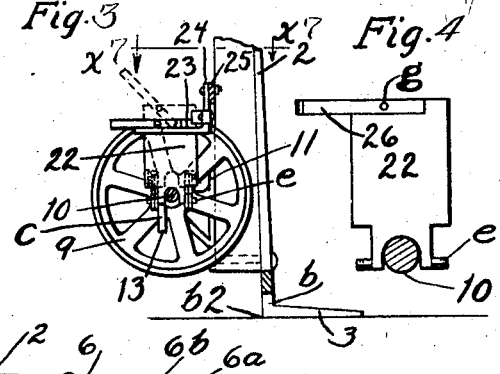
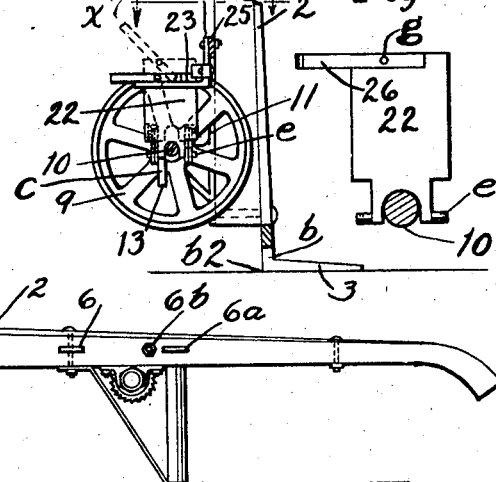
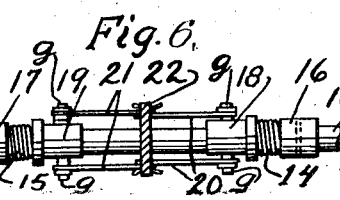
INVENTOR  
CARL O. CARLSON  
WITNESS  
Robt. S. Woolsey  
James R. Townsend  
his atty Sept. 6, 1927.
C. O. CARLSON
LOADING APPARATUS FOR SHOVEL NOSE HAND TRUCKS
Filed Feb. 20, 1926 2 Sheets-Sheet 2
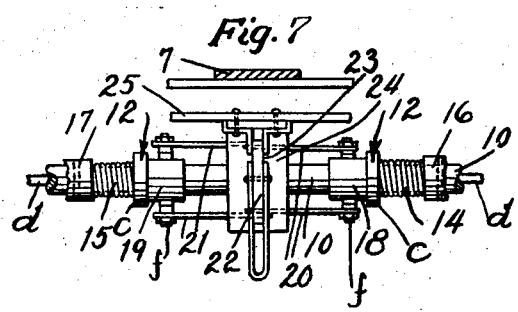
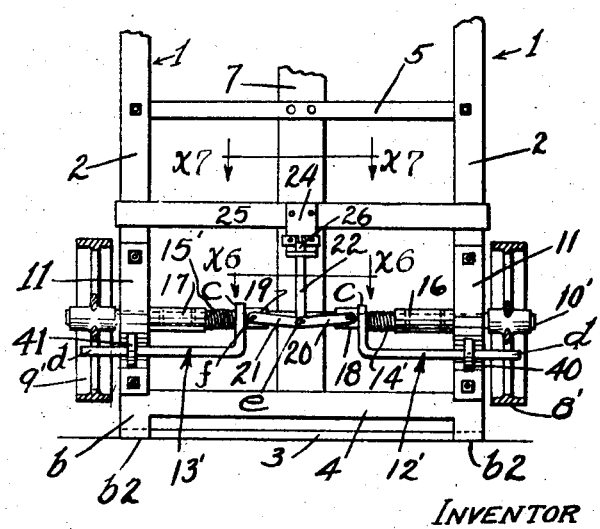
INVENTOR
CARL O. CARLSON Patented Sept. 6, 1927.

1,641,371

UNITED STATES PATENT OFFICE.

CARL O. CARLSON, OF RIVERSIDE, CALIFORNIA.

LOADING APPARATUS FOR SHOVEL-NOSE HAND TRUCKS.

Application filed February 20, 1926. Serial No. 89,516.

This invention relates to means particularly applicable to hand trucks of the shovel nose type in which type a ledge or forward projection at the lower or wheeled end of the truck frame is provided to support the load, and two handles are provided at the other end of the frame for handling the truck and its load.

The invention is broadly new, basic and pioneer with respect to the locking means I have provided for locking the wheels of the truck.

A feature of my invention is a foot actuated control for the wheel locking means.

Another feature is provision for spacing the nose of the truck below the truck side bars and the wheels, to give a greater leverage on the nose, and the load to be lifted thereby.

This invention broadly includes the combination with a hand truck frame having handles at one end, an axle with wheels thereon at the other end, an extension beyond the the wheels and a shovel nose projecting forward from the extension; said extension forming a fulcrum behind the shovel nose and below the truck wheels so that when the frame is upended on the shovel nose and fulcrum, the wheels will be free from the floor or other support on which the shovel nose and fulcrum stand. A further feature that is broadly new, basic and pioneer is the provision of locking members extending between the spokes of the truck wheels and being revolvable therewith, and the means for holding the said members in and out of contact with the truck rails; and means to lock the wheels against rotation relative to the frame; so that the load may be shifted from the support on the fulcrum on the extension, to balance on the wheels, in the operation of bringing the truck frame and the load in position to wheel, so that by then releasing the lock, the truck with its load can be wheeled along the floor.

The invention includes the novel shovel nosed hand truck set forth and various parts and combinations of parts hereinafter more particularly pointed out.

Objects are speed and ease of loading and unloading the truck.

Other objects, advantages and features of invention may appear from the accompanying drawings, the subjoined detailed description and the appended claims.

The accompanying drawings illustrate the invention.

Figure 1 is a fragmental view looking at the rear side of the hand truck standing on the shovel-nose with wheels unlocked and having its wheels mounted inside of the truck frame.

Fig. 2 is a like view with wheels locked.

Fig. 3 is a sectional elevation on line $x^3$, Fig. 2, showing in solid lines, the tripping device in the full locking position of Fig. 2; and in broken lines, the release position of Fig. 1.

Fig. 4 is an enlarged detail of the vertically reciprocating lock operating member, or plate on the axle which is shown in section.

Fig. 5 is a side elevation of the hand trunk at rest on its wheels and legs.

Fig. 6 is a view in section on line $x^6$, Fig. 2.

Fig. 7 is an enlarged section on line $x^7$, Figs. 2 and 3.

Fig. 8 is a fragmental view of the rear side of a hand truck equipped with my invention and having its wheels mounted outside of the truck frame.

The truck frame illustrated in Figs. 1 and 2 comprising side rails 1 that are reinforced and armored by metal straps 2 which are fixed to the side rails 1 by bolts $a$, and form an extension $b$ below the ends of the rails; and the extension is bent to form a fulcrum $b^2$ and the forwardly projecting shovel-nose 3 that connects the lower ends of the straps. The extension and fulcrum serve in the operation of lifting the load and bringing the loaded truck onto the wheels.

The straps and nose are of sufficient thickness and strength to sustain the leverage in lifting any of the loads intended to be carried by the truck.

The rails 1 are shown secured together at the lower ends by said nose and at intermediate points by cross bars 4, 5, 6 and $6^a$ and a tie rod $6^b$.

A strap 7 is secured to the cross bars 4, 5, 6 and $6^a$ and is parallel to and spaced mid-way between the rails 1 to receive the load and allow it to slide up the frame in the operation of loading.

The wheels 8, 9 are journaled on the axle 10, and are disposed within the truck frame, and said axle is mounted in brackets 11 adjacent to the lower ends of the rails 1; and the extension with fulcrum $b^2$ and nose 3, projects sufficiently below or beyond the wheels to cause the wheels to be off the ground when the frame is up-ended and supported by the fulcrum or the shovel-nose resting on the floor or other support.

The wheel locking device comprises a pair of reversely arranged angular members 12, 13, each of which has an inner limb c slidably journalled on the shaft 10 and an outer limb or dog d arranged to extend between the spokes of the wheels 8, 9 and adapted to be projected outward to engage with the frame when slid outward and to be withdrawn from position of engagement with the frame when slid inward.

The locking members are journalled on the shaft so that when the members are moved inwardly toward each other and the center of the frame, they will be free to be revolved on the shaft by the spokes of the wheels when the truck is trundled.

Springs 14, 15 between the inner limbs c and collars 16, 17 are slidably fixed on the axle 10 and normally hold the locking members 12, 13 yieldingly retracted so that the wheels may revolve freely relative to the frame.

Sleeves 18, 19 slidable on the axle 10 are arranged between the members to positively operate said members outwardly to bring the dogs d into position to simultaneously engage the frame and wheel spokes and prevent the wheels from revolving.

Two pairs of links 20, 21 are pivotally connected at their lower or outer ends to the sleeves 18, 19, and are pivotally connected at their upper or inner ends to a vertical reciprocating member in the form of a crotched plate 22 which is vertically slidable in a slot 23 of a bracket 24 that is fixed to a cross member 25 of the frame.

When the plate 22 is moved downward it moves the links 20, 21 to force the sleeves 18, 19 from each other and the dogs d are thereby forced outward beyond the wheels 8, 9 and into position to be intercepted by the frame to prevent revolution of the wheels, so that the truck will not roll away from the object held by the flexible connection in the operation of loading the object.

The plate and links are so arranged relative to each other that when the plate is in its lowest position it rests on the axle and the pivots e between the plate and the links are below the center line drawn from the pivots f so that the dogs will be held in locking position against the force of the springs.

26 is a trip lever fulcrumed by pivot g to the upper end of the plate 22 and adapted to act upon the bracket to lift the plate when the free end of the lever is raised, thus carrying the pivots e, between the links and the plate, above the dead center line, so that the springs can move the sleeves toward each other and cause the links to lift the plate to unlocking position, and the locking members are moved inwardly out of engagement with the side rails 1.

In Fig. 8, I have shown the locking arrangement as applied to a truck having wheels on the outside of the rails 1, 2. The wheels 8', 9' are journalled on a shaft 10' in a manner similar to that already described. The dogs d on members 12', 13' are actuated in the same manner to that already described and are guided through lugs 40, 41 on the rails 1, 2, to intercept the spokes of the wheels.

I claim:—

1. In a hand truck comprising side rails, an axle mounted on said rails, spoked wheels on said axle, locking members adapted to extend between the spokes of said wheels, sleeves slidably mounted on said axle and abutting against said locking members; to move said locking members to engage and disengage the rails to prevent and allow rotation of the wheels.

2. In a hand truck comprising a frame having side rails; an axle mounted on said rails; spoked wheels on said axle; locking members adapted to extend between the spokes of said wheels, collars fixed to the axle, sleeves slidable on said axle and abutting against said locking members; a reciprocating member slidably mounted on said frame; links pivoted to said reciprocating member and sleeves, and arranged to cause the movement of the reciprocating member to move said members into and out of engagement with the side bars.

3. In a hand truck frame comprising side rails, a shaft mounted on said rails, spoked wheels journalled on said shaft, locking members adapted to extend between the spokes of said wheels; sleeves slidably mounted on said shaft; a reciprocating member mounted on said truck, links pivoted to said reciprocating member and said sleeves, whereby movement of said reciprocating member will move said members into and out of engagement with the side rails; and spring means urging said members out of engagement with said rails.

4. In a hand truck comprising side rails, a shaft mounted on said rails, spoked wheels journalled on said shaft, locking members adapted to normally extend between the spokes of said wheels and revolvable therewith; sleeves slidably mounted on said shaft; a reciprocating member slidably mounted on said truck, links pivoted to said reciprocating member and said sleeves, whereby movement of said reciprocating member will move said members into and out of engagement with the side rails; and spring means urging said members out of engagement with said rails.

5. In a hand truck, a frame comprising side rails, an axle mounted on said rails, spoked wheels journalled on said axle, sleeves slidable on said axle, locking members operable by said sleeves and adapted to extend between the wheel spokes, said locking members adapted to revolve with the wheels upon said axle, and means for holding the said locking members and wheels against revolution.

6. In a hand truck, a frame comprising side rails, an axle mounted in said rails, wheels journalled on said axle, locking members adjustably mounted on said axle and revolvable with said wheels, and means for holding the said members against movement to lock said wheels against revolution.

7. In a hand truck, a frame comprising side rails, an axle mounted on said rails, wheels journalled on said axle, locking members extending through said wheels and being revolvable therewith, means for adjusting said members to move the same into engagement with said side rails for locking the wheels against revolution, and means for moving said members out of engagement with said wheels to release the same.

8. In a hand truck, a frame comprising side rails, an axle mounted on said rails, spoked wheels journalled on said axle, sleeves slidable on said axle, locking members connected to said sleeves and adapted to extend between the spokes of said wheels and being revolvable therewith, a reciprocating member slidably mounted on said truck, links pivoted to said reciprocating member and sleeves for moving said locking members into engagement with the side rails of said truck for locking the wheels against movement.

9. In a hand truck, a frame comprising side rails, an axle mounted on said rails, spoked wheels journalled on said axle, sleeves slidable on said axle, locking members operable by said sleeves and adapted to extend between the spokes of said wheels and being revolvable therewith, a reciprocating member slidably mounted on said frame, links pivoted to said reciprocating member and sleeves for moving the locking members into engagement with the side rails of the truck.

10. In a hand truck, a frame comprising side rails, an axle mounted on said rails, spoked wheels journalled on said axle, collars fixed to the axle, sleeves slidable on said axle, locking members operable by said sleeves and adapted to extend between the spokes of said wheels and being revolvable therewith, a reciprocating member slidably mounted on said frame, links pivoted to said reciprocating member and sleeves, springs mounted on said axle between said collars and sleeves and adapted for retracting the locking members from engagement with the side rails of the truck.

11. In a hand truck, a frame comprising side rails, an axle mounted on said rails; wheels journalled on said axle; collars fixed to said axle; sleeves slidable on said axle; locking members operable by said sleeves and adapted for engagement with the frame and wheels to prevent rotation of the wheels relative to the frame; a member slidable relative to said frame; links pivotally connected to said slidable member and sleeves whereby movement of said member will move said locking members into and out of locking position relative to the wheels and frame; and springs disposed between the collars and sleeves for urging said locking members out of locking position relative to the frame and wheels.

In testimony whereof, I have hereunto set my hand at Los Angeles, California, this 12th day of February, 1926.

CARL O. CARLSON.